July 6, 1965  E. A. CARLSON  3,193,198

CONTROL APPARATUS

Filed Nov. 12, 1963

INVENTOR.
ELMER A. CARLSON
BY
ATTORNEY ns
Patented July 6, 1965

3,193,198
CONTROL APPARATUS
Elmer A. Carlson, Richfield, Minn., assignor to Honeywell Inc., a corporation of Delaware
Filed Nov. 12, 1963, Ser. No. 322,966
2 Claims. (Cl. 236—1)

The present invention is concerned with an improved temperature responsive switch or thermostat; in particular, the thermostat is made of a reed switch which is supported in the hole of a donut-shaped permanent magnet attached to a temperature responsive bimetal. As the permanent magnet is moved from one side or the other of the center position, the ferro magnetic switch members of the reed switch close an electrical circuit.

As automatic control of heating and cooling apparatus for a residence becomes more competitive, manufacturers of thermostats and associated control apparatus are constantly endeavoring to improve their products and at the same time provide less expensive products. In thermostat designs, the use of a permanent bar magnet adjacent a switch to obtain a switching action of an electric circuit as the magnet is moved in response to a temperature responsive means is old. In such designs the magnetic coupling between the magnet and the ferro magnetic switch members to obtain proper operation of the switch for the least amount of movement of the magnet has presented various problems.

The present invention is concerned with a donut-shaped or circumscribing permanent magnet so the reed switch can be inserted through the hole in the magnet and the magnet can be moved back and forth from the center position of the reed switch in response to a temperature responsive device or bimetal. By the use of the donut-shaped magnet, a highly concentrated, equally distributed magnetic field is provided in close proximity to the ferro magnetic members of the reed switch to provide operation of the switch with a very small movement of the magnet and thus a small output of the temperature responsive means. Furthermore, by means of adjustable magnetic stops, the movement of the magnet is confined to one or the other side of the center position to provide a reversal action of the thermostat which has been heretofore accomplished in other ways including more expensive double ended switches or reversing relays in the circuit between the thermostat and the control apparatus.

An object of the present invention is to provide an improved themostat for use with heating and cooling apparatus wherein a donut-shaped magnet is used to operate a reed switch when moved from the center position in one or the other direction with means associated with the selector switch for limiting the movement of the magnet to one side of the center position during the control of either the heating apparatus or the cooling apparatus to obtain the reversal action of the thermostat.

This and other objects of the present invention will become apparent upon the study of the following specification and drawing of which FIGURE 1 is a schematic drawing of the control circuit for the improved thermostat using a reed switch to control the operation of a heating and/or cooling apparatus depending upon the operation of the thermostat and the position of a selector switch.

Figure 1:
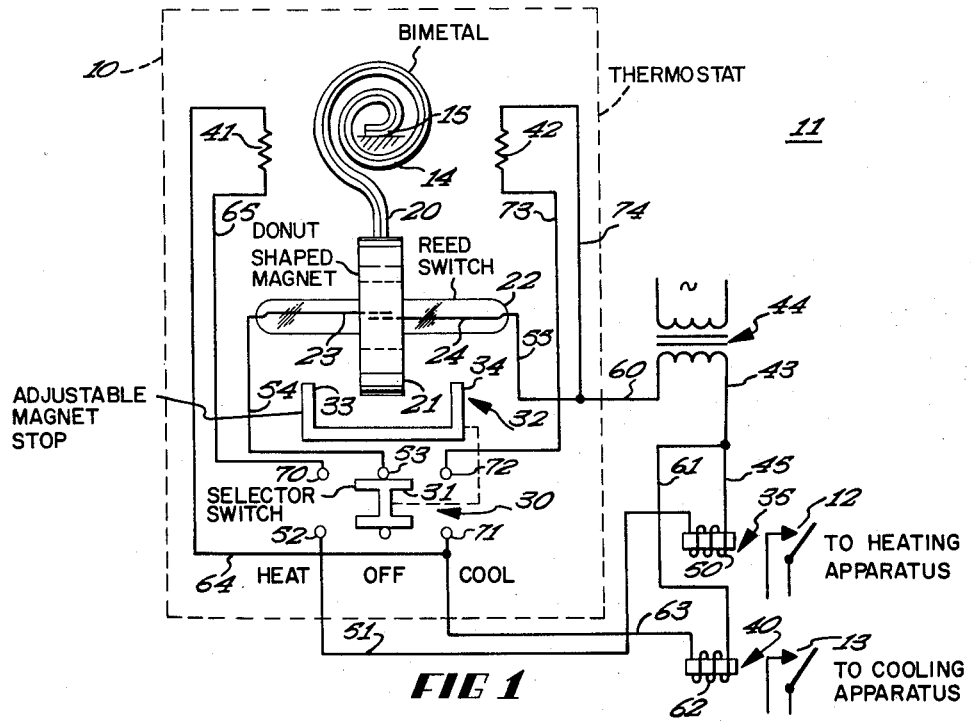

Referring to FIGURE 1, the thermostat 10 is used for controlling the temperature of a space 11 by controlling the operation of heating apparatus connected to switch 12 or cooling apparatus connected to switch 13. Thermostat 10 has a temperature responsive means or bimetal 14 which is supported at one end 15 and has a free end 20 attached to a donut-shaped or circumscribing shaped permanent ferro magnetic member or magnet 21. Magnet 21 has one pole on the inner surface or hole and another pole on the outer periphery or surface. As shown, magnetic member 21 is in a center position as determined by some conventional type of calibration means such as the adjustment of the fixed end 15 of the bimetal. A reed switch 22 of the type shown in the Bascom Patent 2,203,321 has a pair of ferro magnetic members 23 and 24 protruding from the opposite ends of the tube to have their free ends in close proximity for closure to provide a closed electrical circuit. Switch 22 is mounted through the hole or opening in magnet 21 so that when the magnet is in the position as shown, the magnetic field produced about the ferro magnetic members 23 and 24 causes the members to repel and provide an open circuit through the switch. While magnet 21 is shown as donut-shaped, the magnet might be of any type to circumscribe or surround members 23 and 24 to provide a maximum concentration of magnetic flux and not bias members 23 and 24 too greatly. For example, with a conventional bar magnet on one side of switch 22, members 23 and 24 would be biased or attracted toward the magnet in addition to the normal repelling action between members 23 and 24. The circumscribing type magnet provides for a greater flux concentration and any side forces on members 23 and 24 are minimized. Members 23 and 24 are attracted toward the poles of magnet 21, but since the pole surface surrounds members 23 and 24, the members are not biased predominantly in one direction. Members 23 and 24 react mainly to the force of the repelling action when one is made a north pole and the other a south pole by the shifting flux field as magnet 21 moves. Magnet 21 has a relatively narrow width and could be made to have a narrow pole piece so the flux which is directed to said switch is concentrated to a relatively narrow width.

While magnet 21 is shown to have the poles spaced radially a circumscribing type magnet with a pole axis parallel to the axis of the hole so the flat surfaces are the pole faces could be used. In such a design, the magnetic flux would have a reverse effect on switch 22 as members 23 and 24 would be closed with magnet 21 in the center position as shown in FIGURE 1 and upon movement to the left or right switch 21 would be opened.

A selector switch 30 has a movable bar member 31 which can be moved from the center which is marked "off" position to either the left side or "heat position" or to the right side for the "cool position." Member 31 is physically connected to an adjustable magnetic stop member 32 which is a U-shaped member providing the vertical projections 33 and 34 which are adapted to engage the permanent magnet 21. In the position shown, magnet 21 is free to move away from the center position in either direction.

The thermostat 10 is connected into a conventional heating and cooling control system. A pair of relays 35 and 40 are associated with switches 12 and 13 respectively. Connected into the control circuit are a pair of resistance heaters 41 and 42 thermally connected to bimetal 14 to provide for heating and cooling "anticipation." For the heating operation or the control of relay 35, a circuit is provided traced as follows: from terminal 43 of a source of power or secondary of a stepdown transformer 44, a conductor 45, a winding 50 of relay 35, a conductor 51, terminal 52, selector switch bar 31, a terminal 53, a conductor 54, reed switch members 23 and 24, a conductor 55, and back to the other terminal 60 of the secondary winding. At the same time, the heating anticipation resistor 41, is energized as follows: from terminal 43, a conductor 61, a winding 62 of relay 40, conductor 63, conductor 64, resistor 41, conductor 65, terminal 70, bar 31, terminal 53, and back through the reed switch 22 to the other side of the source of power 63.

When the selector switch is thrown to the extreme right position, the cooling apparatus will be energized when the reed switch closes through the circuit traced as follows: a secondary winding terminal 43, conductor 61, winding 62 of the cooling apparatus of the cooling relay, conductor 63, terminal 71, shorting bar 31, terminal 53, conductor 54, switch 22, and back to the other side of the source of power 60. When the switch is de-energized by opening the circuit between members 23 and 24, the cooling anticipation resistor 42 is placed in the circuit as it is connected in parallel with the reed switch through the circuit traced as follows: from terminal 72, a conductor 73, resistance 42, a conductor 74, and back to terminal 60 of the secondary winding.

Figures 2, 3, 4:
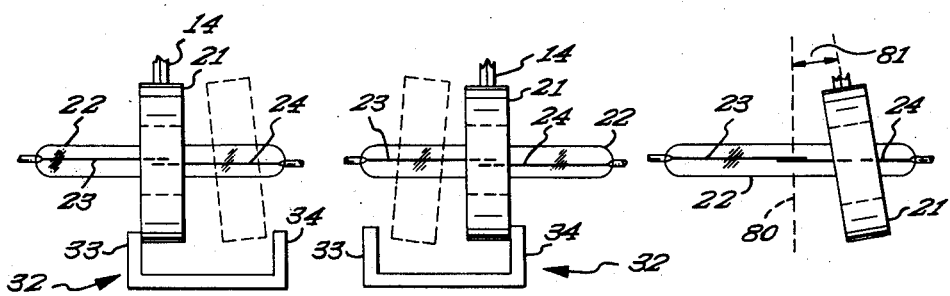
FIGURE 2 is a detailed showing of the range of movement of the magnet with respect to the switch for the cooling operation of the system shown in FIGURE 1.
FIGURE 3 is a detailed showing of the magnet operation with respect to the switch for the heating phase of the operation of FIGURE 1.
FIGURE 4 is a showing of the switch operator when moved to one side of the center position with the ferro magnetic members of the switch closed.

When the selector switch is moved to the right to the cooling position, not only is the electrical circuit made for the cooling operation but the stop member 32 is positioned to the right as shown in FIGURE 2. Magnet 21 is then free to move from the center position as shown to right position under the control of the bimetal 14 for the cooling operation. When the magnet is in the center position, the reed switch members 23 and 24 are apart and the circuit is opened; however, as magnet 21 moves away from the center position toward the position shown in the dotted line, members 23 and 24 will move together to close the electrical circuit. Since the magnet is not allowed to move in the opposite direction as it would hit the stop member 33, the circuit made through the reed switch 22 can only be opened upon a temperature rise of the bimetal 14.

A similar type of operation is provided in the opposite manner for the heating operation when the selector switch of FIGURE 1 is moved to the left to the heat position as the adjustable stop 32 is then repositioned as shown in FIGURE 3. Stop member 34 is then positioned to prevent the magnet 21 from moving to the right of the center position so the switch can be only opened when the magnet is moved to the left upon a cooling of the bimetal 14 as shown in FIGURE 3.

The angle of movement of magnet 21 with respect to the center line 80 as shown in FIGURE 4 is defined as angle 81. Angle 81 depends upon a concentration flux produced by magnet 21 which is effective upon the ferro magnetic members 23 and 24. With the use of the circumscribing shaped magnet 21, the angle 81 between the center line position and the position of the magnet to provide for the operation of the reed switch 22 is smaller for a given magnet strength.

Figure 5:
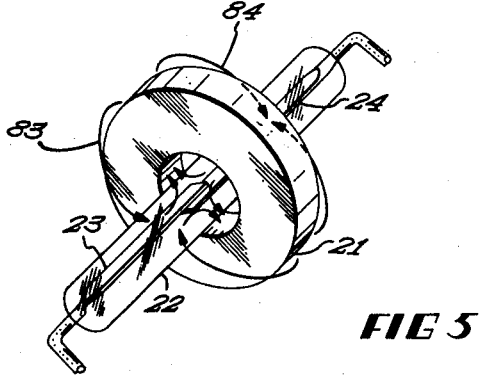
FIGURE 5 is a prospective view of the reed switch as held in a position through the hole in the center of the donut-shaped magnet.

As shown in FIGURE 5, a donut-shaped magnet 21 surrounds the reed switch to provide a magnetic force as shown by lines 83 and 84 which would produce a concentration of magnetic flux through the magnetic members 23 and 24 to cause the members to repel each other. By having the permanent magnet surrounding members 23 and 24 near the center position, a flux balance is established and the resultant lateral force on members 23 and 24 is minimized. With a magnet having the pole axis parallel to the hole, the poles would be on the opposite flat faces and the magnetic flux would come out of the magnet face to pass through switch members 23 and 24.

Figure 6:
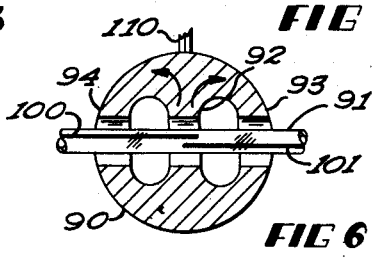
FIGURE 6 is a second embodiment of the present invention showing a circumscribing magnet.

FIGURE 6 discloses a second embodiment of the invention. A magnet 90 circumscribes switch 91 which is similar to switch 22. The magnetic flux path is from the center leg to the opposite legs 93 and 94 as shown by the arrows. With this embodiment the air gap in the magnetic circuit is greatly reduced. When bimetal 110 moves magnet 90 to the left or right, switch 91 is operated in a similar manner as described for the embodiment of FIGURES 1 to 5. The arrows indicate the flux path; however, with a pole axis parallel to the hole the flux would not flow in both directions as shown.

*Operation*

As shown in FIGURE 1, the system is in the off position with the selector switch in the center and the stop member 32 centered. With the application of a source of power to the primary of transformer 44, the system is available to control either the heating or cooling apparatus is connected to the switches 12 and 13, respectively. Upon movement of the selector switch to the left, to select heating, the adjustable stop 32 is moved to the left so the vertical member 34 prevents the movement of magnet 21 to the right from the center position. Upon a decrease in the space temperature to cool bimetal 14, magnet 21 is moved to the left away from the center position and members 23 and 24 of the reed switch close to energize the heating relay 35. Upon the energization of the heating relay and the heating apparatus, heat anticipation resistor 41 is energized to artificially heat the thermostat bimetal 14 for anticipation purposes. As the bimetal 14 heats up due to the heat anticipation, resistor heat 41 and the heat obtained from the heating apparatus to space 11, magnet 21 is moved to the right back to the center position. The movement of magnet 21 is shown in FIGURE 3. By the concentration of force on the reed switch, the angle of movement for the magnet 21 from the center position to the left to obtain operation of the reed switch is quite small. In this manner, the differential of the thermostat or the temperature range between a close and open switch is rather small.

For the cooling operation, selector switch 31 is moved to the right to connect cooling relay 40 to the thermostat. The movement of magnet 21 is restricted from the center position to the right by the adjustable stop 32 as shown in FIGURE 2 so the reed switch will only close to energize the cooling apparatus relay 40 upon an increase in the temperature to move the reed switch to the right.

By means of the reed switch and the circumscribing shaped magnet operating from the center position to obtain a closing operation, the switch members 23 and 24 provides for a reverse in the operation of the thermostat switch without the need of a reversal relay. Heating and cooling relays 35 and 40 can be directly connected to the thermostat switch and the reversal operation is obtained through the switch design. With such a thermostat design, the overall circuitry connected to the thermostat for obtaining a heating and cooling operation with the selective changeover is greatly reduced and the expense of the control system is lessened to the ultimate customer.

With the embodiment of FIGURE 6, the magnetic circuit contains less air gap and a greater concentration of magnetic flux is obtained. The lateral force on switch members 100 and 101 of switch 91 is minimized by the magnetic flux surrounding the switch members.

While the invention is shown in one particular embodiment, the intention is to limit the scope of the invention by the appended claims in which I claim:

1. In a thermostat for controlling heating and cooling apparatus,
a bimetal, a reed switch having a pair of ferro magnetic members sealed in a glass tube to close a circuit when said members move together, a donut-shaped permanent magnet connected to a free end of said bimetal, said magnet being supported with said reed switch passing through the hole in said magnet whereby said switch is open when said magnet is in a predetermined position with respect to said members and said switch is closed when said magnet moves to either side of said predetermined position under the influence of said bimetal, a changeover switch, circuit means including said changeover switch adapted to connect said reed switch to control the heating or cooling apparatus, and means associated with said changeover switch for limiting the movement of said magnet to one or the other side of said predetermined position depending upon whether heating or cooling is selected.

2. In a thermostat for controlling heating and cooling apparatus, a bimetal, a reed switch having a pair of ferro magnetic members sealed in a glass tube to close a circuit when said members move together, a circumscribing permanent magnet connected to a free end of said bimetal, said magnet being supported with said reed switch passing through a hole in said magnet whereby said switch is open when said magnet is in a first position with respect to said members and said switch is closed when said magnet moves to a second position under the influence of said bimetal, a changeover switch, circuit means including said changeover switch adapted to connect said reed switch to control the heating or cooling apparatus, and means associated with said changeover switch for limiting the movement of said magnet depending upon whether heating or cooling is selected.

References Cited by the Examiner

UNITED STATES PATENTS

| 2,240,847 | 5/41 | Hildebrecht | 200—138.4 X |
| 2,823,283 | 2/58 | Malone | 200—138.7 |
| 2,892,051 | 6/59 | Moore | 200—81.9 |
| 2,991,341 | 7/61 | Ulanet | 200—138.7 |
| 3,014,704 | 12/61 | Bierwith | 165—26 |
| 3,047,273 | 7/62 | Scarr | 165—26 |

EDWARD J. MICHAEL, *Primary Examiner.*